Dec. 29, 1942.    R. W. WAGNER    2,306,767
POWER TAKE-OFF UNIT
Filed May 4, 1942    2 Sheets-Sheet 1
FIG.I.
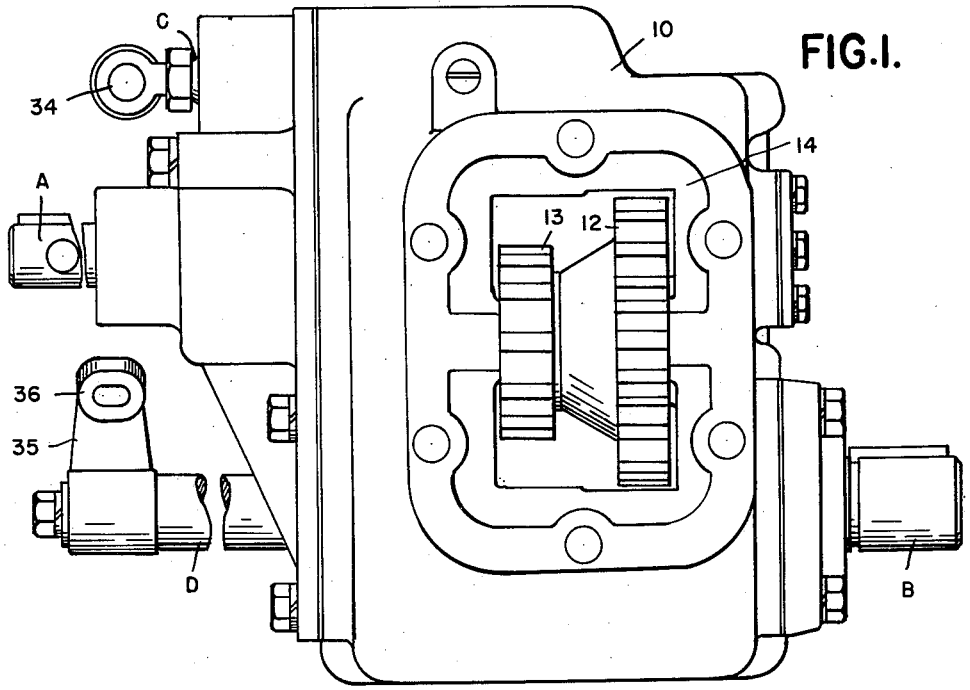
FIG.4.
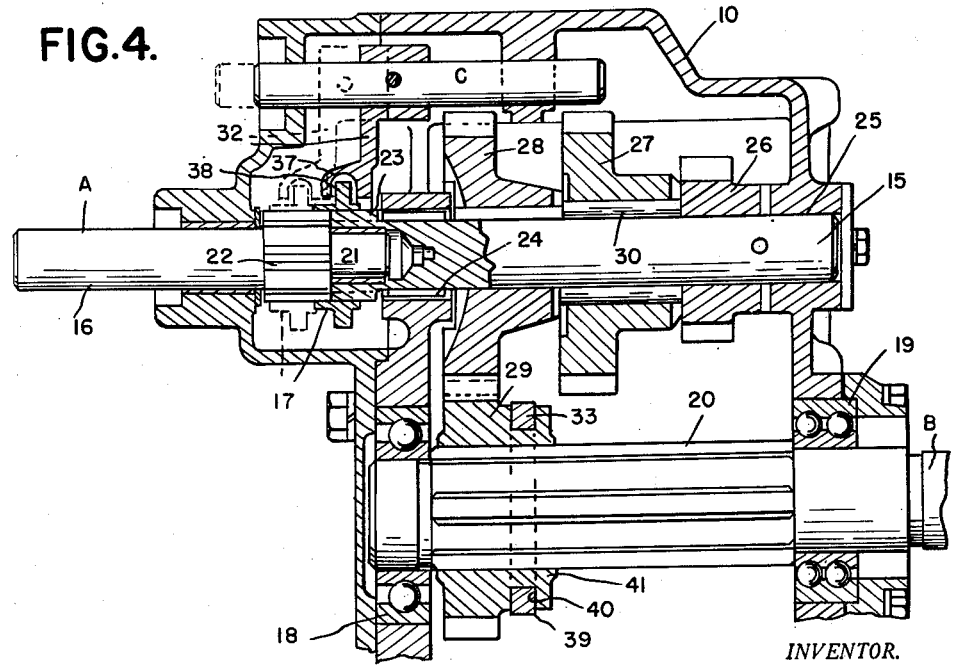
INVENTOR.
ROBERT W. WAGNER
BY
*Whittemore, Hulbert & Belknap*
ATTORNEYS Dec. 29, 1942.   R. W. WAGNER   2,306,767
POWER TAKE-OFF UNIT
Filed May 4, 1942   2 Sheets-Sheet 2
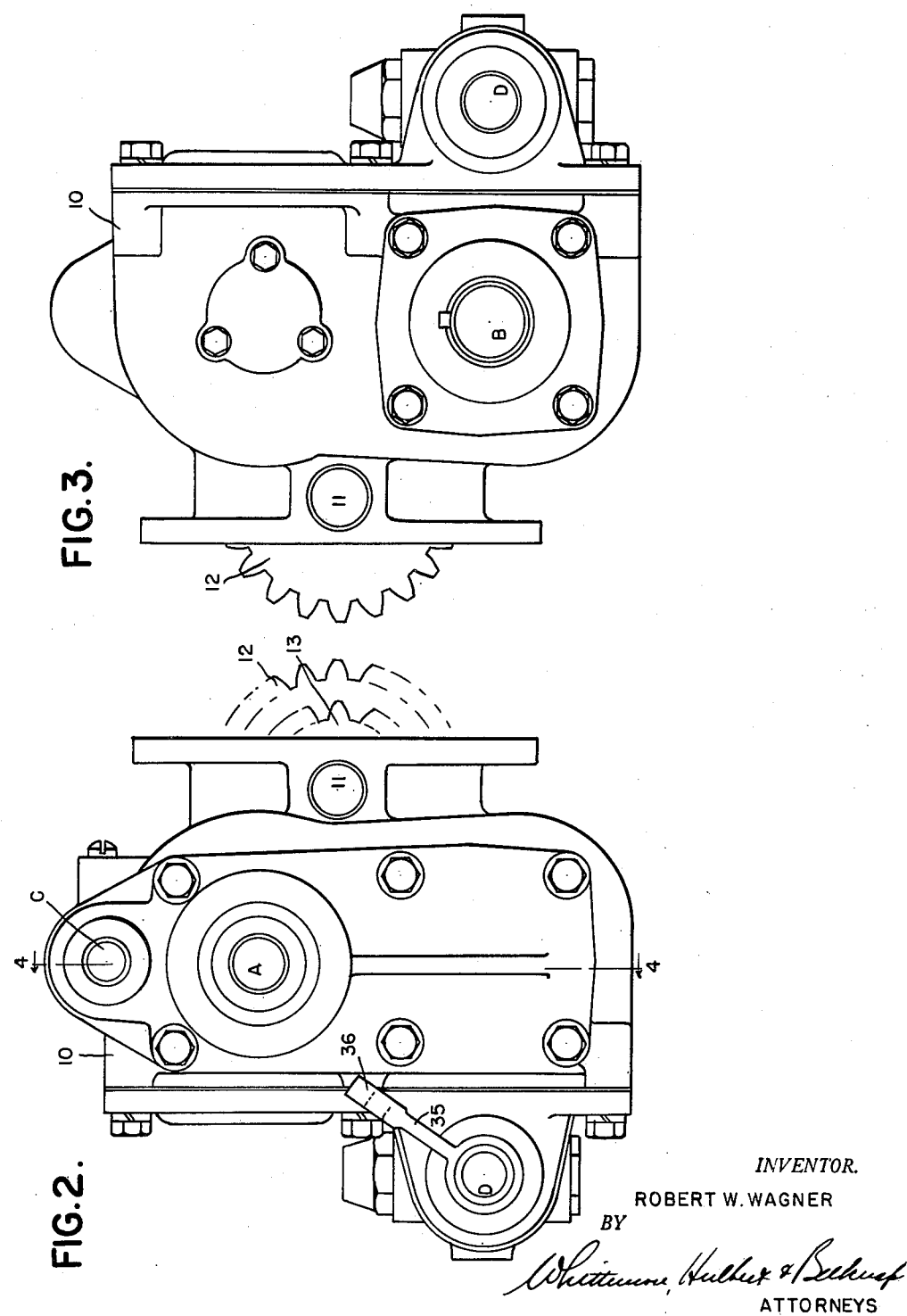
INVENTOR.
ROBERT W. WAGNER
BY
Whittemore, Hulbert & Belknap
ATTORNEYS Patented Dec. 29, 1942

2,306,767

UNITED STATES PATENT OFFICE 2,306,767

POWER TAKE-OFF UNIT

Robert W. Wagner, Chelsea, Mich.

Application May 4, 1942, Serial No. 441,725

12 Claims. (Cl. 74—11)

This invention relates generally to power take-off units and refers more particularly to those designed for use with the transmissions of motor vehicles such as trucks, tractors and the like.

One of the essential objects of the invention is to provide a unit of the type mentioned having two drive shafts capable of being driven at different speeds.

Another object is to provide a power take-off unit wherein either of the drive shafts mentioned may be rendered inoperative while the other is operating or both may be rendered inoperative, as desired.

Another object is to provide a power take-off unit wherein one of the drive shafts may be driven at a constant speed while the other may be driven at either high or low speeds or in reverse.

Another object is to provide a power take-off unit having improved means for controlling the operation of the drive shafts as aforesaid.

Other objects, advantages and novel details of construction of this invention will be made more apparent as this description proceeds, especially when considered in connection with the accompanying drawings, wherein:

Figure 1 is an elevational view of a power take-off unit embodying my invention;

Figure 2 is an end view thereof;

Figure 3 is another end view thereof;

Figure 4 is a vertical sectional view taken substantially on the line 4—4 of Figure 2.

Referring now to the drawings, 10 is a casing, or housing adapted to be bolted or otherwise secured to the transmission housing (not shown) of a motor vehicle such as a truck, tractor and the like, 11 is a shaft journaled in said casing, and 12 and 13 respectively are laterally spaced gears on the shaft 11 and extending through a suitable opening 14 in one wall of the casing. Preferably the larger gear 12 is integral with the smaller gear 13 and is adapted to be constantly in mesh with and driven by one of the transmission gears (not shown) of the motor vehicle.

Also journaled in the casing 10 are drive shafts A and B respectively which are preferably parallel to each other and extend through opposite ends of the casing 10. The upper shaft A comprises two axially aligned sections 15 and 16 respectively that are adapted to be coupled together by a collar 17, while the lower shaft B is a one piece member and is provided between the bearings 18 and 19 therefor with a longitudinally extending splined portion 20. The inner end portion 21 of the section 16 is journaled within the adjacent end of the section 15, and the collar 17 is slideable longitudinally of splined portions 22 and 23 of said sections to effect the coupling mentioned.

Mounted on the shaft section 15 at longitudinally spaced points thereof between the bearings 24 and 25 respectively therefor are three gears 26, 27 and 28 respectively, while slideably mounted on the splined portion 20 of the shaft B is a gear 29. The gears 26 and 28 are keyed or otherwise nonrotatably secured to the section 15, while the gear 27 is free to rotate upon suitable bearings 30 carried by the section 15. Preferably the gear 26 is relatively small and is in constant mesh with and adapted to be driven by the gear 12 on the shaft 11, and the gear 27 is larger and is constantly in mesh with and adapted to be driven by a small gear 13 on said shaft 11. Thus, by this arrangement a differential in speed is obtained. The gear 28 is equal in diameter to the gear 27 but is adapted to be engaged by the slideable gear 29 on the lower shaft B. Likewise, the gear 27 is adapted to be engaged by the slideable gear 29.

C and D respectively are shifter shafts slideably mounted in and projecting laterally from the casing 10, and 32 and 33 respectively are shifter forks within said casing 10 and nonrotatably mounted on said shafts. At the outer end of the shaft C is an eye 34 to which any suitably operating means (not shown) may be connected, while at the outer end of the shaft D is an arm 35 having an eye 36 to which any suitable operating means (not shown) may be connected. The fork 32 has a bifurcated portion 37 straddling an annular flange 38 of the collar 17, while the fork 33 has a yoke 39 engaging an annular groove or recess 40 in the hub 41 of the gear 29. Thus, by actuating the shaft C the fork 32 will move the collar 17 from the dotted to the full line positions (Figure 4) to couple together the sections 15 and 16, and by actuating the shaft D the fork 33 will move the gear 29 from the position illustrated in Figure 4 in mesh with the gear 28 to a position in mesh with the gear 27 and then to another position in mesh with the gear 12. As shown, the spacing between the gears 26, 27 and 28 respectively and the size of the gear 26 is such that two neutral positions are provided for the gear 29, one when the gear 29 is opposite the space between gears 28 and 27, and the other when the gear 29 is opposite the space between gears 27 and 26. When gear 29 is opposite gear 26 it is in mesh with gear 12.

In use, the inner section 15 of the shaft A is running constantly while the transmission of the motor vehicle is operating because the gear 26 fixed thereto is constantly in mesh with gear 12 which in turn is constantly in mesh with the transmission gear (not shown) of the motor vehicle. Likewise, the gear 27 is running constantly because it is in constant mesh with gear 13 that in turn is integral with gear 12. Thus, when it is desired to drive the outer section 16 of the shaft A from the inner section 15, the shaft C is actuated to cause the fork 32 to shift collar 17 from the dotted to the full line position illustrated in Figure 4. If, at this time, it is desired to have shaft B idle then shaft D is actuated to cause the fork 33 to shift gear 29 to the idle position opposite the space between the gears 28 and 27. If however it is desired to have shaft B driven at the same time, then gear 29 is placed in mesh with gear 28 to obtain a high speed drive, or with gear 27 to obtain a slow speed drive, or with gear 12 to be driven in reverse. Either of the neutral positions mentioned may be used when the gear 29 is shifted from the respective gears 28, 27 and 12 respectively. For Example, the neutral position opposite the space between gears 28 and 27 may be used when the gear 29 is shifted from either gears 28 or 27, while the neutral position opposite the space between gears 27 and 26 may be used when the gear 29 is shifted from either gears 27 or 12.

What I claim as my invention is:

1. A power take-off unit having a casing, two shafts carried by said casing, three gears on one of said shafts, two of said gears being fixed to said shaft and the third being free to rotate thereon, means operable by the transmission of an engine for driving the free gear and one fixed gear, and means for driving the second shaft including means adapted to mesh respectively with and be driven by one of the fixed gears and the free gear aforesaid.

2. A power take-off unit having a casing, a shaft carried by said casing, rigidly connected gears on said shaft, one being larger than the other and adapted to mesh with and be driven by a gear of a transmission of a motor vehicle, two shafts carried by said casing, three gears on one of the two last mentioned shafts, one of said gears being fixed to said shaft and constantly in mesh with and driven by the larger of said rigidly connected gears, another being free on said shaft and constantly in mesh with and driven by the smaller of said rigidly connected gears, the third gear on said shaft being fixed thereto, the second of the two last mentioned shafts having a splined portion, and a gear shiftable on the splined portion of the last mentioned shaft to mesh with either the third or second mentioned gears on the first of the last two mentioned shafts or with the larger of the rigidly connected gears aforesaid.

3. A power take-off unit having a casing, a shaft carried by said casing, connected gears on said shaft, one being larger than the other and adapted to mesh with and be driven by a gear of a transmission of a motor vehicle, two other shafts carried by said casing, three gears on one of the two last mentioned shafts, one being fixed to said shaft and constantly in mesh with and driven by the larger of said connected gears, another being free on said shaft and constantly in mesh with and driven by the smaller of said connected gears, the third gear on said shaft being fixed thereto, and a gear splined upon the second of the last mentioned shafts and adapted to mesh with either the third or second mentioned gears on the first of the last two mentioned shafts or with the larger of the two connected gears aforesaid.

4. A power take-off unit having a casing, three shafts carried by said casing, two rigidly connected gears on one of said shafts, one of said gears being adapted to mesh with and be driven by a gear of a transmission of a motor vehicle, three separate gears on the second of said shafts, one being fixed to said second shaft and constantly in mesh with and driven by one of the rigidly connected gears on the first shaft, the second of said gears being free on said second shaft and constantly in mesh with and driven by the other of the rigidly connected gears on the first shaft, the third of said gears being fixed to the second shaft, and a gear slidably but non-rotatably mounted on the third shaft and adapted to mesh with either the third or second mentioned gears on the second shaft or with one of the two rigidly connected gears on the first shaft.

5. A power take-off unit having a casing, three shafts carried by said casing, two rigidly connected gears on one of said shafts, one of said gears being adapted to mesh with and be driven by a gear of a transmission of a motor vehicle, the second of said shafts having axially aligned sections, three separate gears on one section of the second of said shafts, one being fixed to said section and constantly in mesh with and driven by one of the rigidly connected gears on the first shaft, the second of said gears being free on said section and constantly in mesh with and driven by the other of the rigidly connected gears on the first shaft, the third of said gears being fixed to said section, a gear slidably but non-rotatably mounted on the third shaft and adapted to mesh with either the third or second mentioned gears on said section of the second shaft or with one of the two rigidly connected gears on the first shaft, and means for coupling together the sections of the second shaft.

6. A power take-off unit having a casing, two shafts carried by said casing, one of said shafts having axially aligned sections, three separate gears on one section of the sectional shaft, one being fixed to said section and adapted to be driven by the transmission of an engine, the second of said gears being free on said section and adapted to be driven by the transmission of an engine, the third of said gears being fixed to said section, a gear slidably but non-rotatably mounted on the second shaft and adapted to mesh with either the third or second mentioned gears on said section of the first shaft, means for coupling together the sections of the first shaft, and means for sliding the gear on the second shaft to and from engagement with the third or second mentioned gears on said section of the first shaft.

7. A power take-off unit having a casing, two shafts carried by said casing, three gears on one of said shafts, two being fixed to said shaft and the third being free to rotate thereon, means operable by the transmission of an engine for driving the free gear and one fixed gear, and means for driving the second shaft from the first shaft including a gear splined on the second shaft and adapted to mesh respectively with and be driven by one of the fixed gears and the free gear aforesaid.

8. A power take-off unit having a casing, three shafts carried by said casing, two rigidly connected gears on one of said shafts, one of said gears being adapted to mesh with and be driven by a gear of a transmission of a motor vehicle, the second of said shafts having axially aligned sections, three separate gears on one section of the second of said shafts, one being fixed to said section and constantly in mesh with and driven by one of the rigidly connected gears on the first shaft, the second of said gears being free on said section and constantly in mesh with and driven by the other of the rigidly connected gears on the first shaft, the third of said gears being fixed to said section, a gear slidably but non-rotatably mounted on the third shaft and adapted to mesh with either the third or second mentioned gears on said section of the second shaft or with one of the two rigidly connected gears on the first shaft, means for coupling together the sections of the second shaft, and means for sliding the gear on the third shaft to and from engagement with the third or second mentioned gears on said section of the second shaft or with one of the two rigidly connected gears on the first shaft.

9. A power take-off unit having a casing, three shafts carried by said casing, two rigidly connected gears on one of said shafts, one of said gears being adapted to mesh with and be driven by a gear of a transmission of a motor vehicle, three separate gears on the second of said shafts, one being fixed to said second shaft and constantly in mesh with and driven by one of the rigidly connected gears on the first shaft, the second of said gears being free on said second shaft and constantly in mesh with and driven by the other of the rigidly connected gears on the first shaft, the third of said gears being fixed to the second shaft, a gear slidably but non-rotatably mounted on the third shaft and adapted to mesh with either the third or second mentioned gears on the second shaft or with one of the two rigidly connected gears on the first shaft, and means for sliding the gear on the third shaft to and from engagement with the third or second mentioned gears on the second shaft or with one of the two rigidly connected gears on the first shaft.

10. A power take-off unit having a casing, two drive shafts journaled in and projecting outwardly from said casing, one having axially aligned sections, means for coupling one section of the sectional drive shaft to the second section thereof, three gears on one section of said sectional drive shaft, two being fixed to said section and the third being free to rotate thereon, means operable by the transmission of an engine for driving the free gear and one fixed gear, and means for driving the second drive shaft including means adapted to mesh respectively with and be driven by one of the fixed gears and the free gear aforesaid.

11. A power take-off unit having a casing, a shaft journaled in said casing, integral gears on said shaft, one being larger than the other and adapted to mesh with and be driven by a gear of a transmission of a motor vehicle, two drive shafts journaled in and projecting outwardly from said casing, one having axially aligned sections, provided with splined portions, a collar slideable on said splined portions to connect said sections, the second drive shaft being a one piece member having a splined portion, three gears on one section of the first drive shaft, one being fixed to said section and constantly in mesh with and driven by the larger of said integral gears, another being free on said section and constantly in mesh with and driven by the smaller of said integral gears, the third gear on said section being fixed thereto, and a gear shiftable on the splined portion of the second drive shaft to mesh with either the third or second mentioned gears on said section of the first drive shaft or with the larger of the integral gears aforesaid.

12. A power take-off unit having a casing, a shaft journaled in said casing, connected gears on said shaft, one being larger than the other and adapted to mesh with and be driven by a gear of a transmission of a motor vehicle, two drive shafts journaled in and projecting outwardly from said casing, one having axially aligned sections, means for connecting said sections, the second drive shaft being a one piece member, three gears on one section of the first drive shaft, one being fixed to said section and constantly in mesh with and driven by the larger of said connected gears, another being free on said section and constantly in mesh with and driven by the smaller of said connected gears, the third gear on said section being fixed thereto, and a gear slideable but nonrotatably mounted on the second drive shaft and adapted to mesh with either the third or second mentioned gears on said section of the first drive shaft or with the larger of the two connected gears aforesaid.

ROBERT W. WAGNER.